United States Patent

[11] 3,633,108

[72] Inventor Joseph G. Kneuer
Fair Haven, N.J.
[21] Appl. No. 808,130
[22] Filed Mar. 18, 1969
[45] Patented Jan. 4, 1972
[73] Assignee Bell Telephone Laboratories Incorporated
Murray Hill, N.J.

[54] TIMING RECOVERY THROUGH DISTORTION MONITORING IN DATA TRANSMISSION SYSTEMS
9 Claims, 5 Drawing Figs.

[52] U.S. Cl. .......... 325/323, 325/324, 325/326, 328/155
[51] Int. Cl. .......... H04b 1/10
[50] Field of Search .......... 325/38, 38.1, 38 A, 42, 321, 322, 323, 324, 325, 326; 179/15; 328/63, 72, 73, 155; 178/69

[56] References Cited
UNITED STATES PATENTS

| | | | |
|---|---|---|---|
| 3,401,342 | 9/1968 | Becker | 325/324 |
| 3,411,090 | 11/1968 | Lescinsky | 325/323 |
| 3,508,153 | 4/1970 | Gerrish et al. | 325/323 |
| 3,440,548 | 4/1969 | Saltzberg | 328/155 |

*Primary Examiner*—Robert L. Griffin
*Assistant Examiner*—Albert J. Mayer
*Attorneys*—R. J. Guenther and Kenneth B. Hamlin

ABSTRACT: A receiver timing recovery arrangement for band-limited data transmission systems, particularly where adaptive equalizers are used, compensates for mistiming in the receiver eye pattern by generating caliper levels straddling a nominal received amplitude. The caliper spacing is continually expanded or contracted depending on whether the received signals at sampling times lie outside or between the caliper levels. The phase of the sampling wave is made to sweep back and forth about its nominal position, the direction of the sweep being reversed whenever the caliper spacing requires expanding. The timing wave thus adaptively seeks the instant of minimum noise and intersymbol interference.

INVENTOR
J. G. KNEUER
BY J. P. Kearns
ATTORNEY

TIMING RECOVERY THROUGH DISTORTION MONITORING IN DATA TRANSMISSION SYSTEMS

FIELD OF THE INVENTION

This invention relates to the recovery of timing and sampling information in synchronous data transmission systems.

BACKGROUND OF THE INVENTION

In synchronous digital data transmission systems generally, the received baseband signal is filtered to remove out-of-band noise and interference and then sampled during each signaling interval. The results obtained by such sampling determine the character and reliability of the output data. Overall error performance of the date transmission system depends critically on the choice of the sampling instant, particularly when multilevel signaling and relatively sharp filtering are employed.

The sampling frequency to be used in a data receiver can be obtained fairly readily either from the data signal itself or from some auxiliary signal. Whatever the source of the sampling frequency, final phase control is best obtained from the received signal itself which has been subjected to phase distortions in the transmission medium.

Existing sampling systems generally slice the received data signal about one or more thresholds depending on the number of levels transmitted and find the median of the threshold crossing times. The sampling instant is then chosen at a time displaced by one-half the signaling interval from the median of the transition times. If the receiver eye pattern (obtained by a superposition of successive signal intervals on a synchronized oscilloscope) is distorted due to mistiming of an adaptive equalizer, but essentially symmetric in time, as will be the case for sharply band-limited signal, the timing phase established by threshold crossings will exhibit little corrective tendency. As the symbol rate approaches one-half the available transmission bandwidth, the composite system of adaptive equalizer control and timing recovery becomes neutral to timing phase error. Small imbalance in the timing transition detector results in free drifting of the phase of the sampling instants until the equalizer either limits the unacceptably high distortion or the adaptive control algorithm fails completely.

Proposals have been investigated for basing sampling times on the minimization of the time derivative of the received data signal and on measurements of the maximum eye opening. Unfortunately, due to the fact that present adaptive equalizers operate on the premise that the timing is correct and the way to correct distortion is to generate a symmetrical eye pattern, these proposals do not supply entirely satisfactory solutions to the problem in the sharply band-limited case.

It is an object of this invention to improve timing recovery techniques in band-limited digital data transmission systems.

It is another object of this invention to monitor the deviation of received samples of digital data from their expected values as a measure of distortion imparted by transmission channels traversed by such data.

It is a further object of this invention to provide adynamic timing wave which samples successive data intervals at different relative instants in a continuing search for the optimum instant.

It is yet another object of this invention to program an adaptive search for an optimum sampling instant and to base changes in the program on distortion measurements made at sampling instants.

SUMMARY OF THE INVENTION

According to this invention, a digital data timing recovery system is based on a monitoring of the eye pattern generated by the received data signal. In a first aspect of the invention, each data sample taken is compared in amplitude with caliper levels bracketing the nominal expected level as a distortion measure. When the sample falls between the caliper levels, distortion is assumed to be decreasing and the spacing of the next pair of caliper levels is contracted. When the sample falls outside the caliper levels, distortion is assumed to be increasing and the spacing between the next pair of caliper levels is expanded in an attempt to capture the next sample within the new caliper levels. The spacing of the caliper levels, and particularly the rate of change of such spacing, becomes a useful index, not only of the changing character of the distortion, but also of the correctness of the phase of the sampling or timing wave. Thus, if the caliper spacing is decreasing then the timing phase is approaching optimum; whereas an increasing caliper spacing indicates that the timing phase is incorrect. In the latter case, the timing phase can be experimentally advanced or retarded until the calipers begin to contract.

In another aspect of this invention, the control of the timing phase is automated in conjunction with the changing distortion as indicated by the direction of caliper motion. Inasmuch as the direction of caliper motion is only ambiguously related to direction of the timing phase, it is necessary to make the timing phase a dynamic quantity. Accordingly, the phase of the timing wave is programmed to change continuously from sample to sample. Starting from an arbitrary direction of either advancing or retarding phase from sample to sample, the timing phase is continued in the same direction as long as the calipers are closing and reversed whenever the calipers begin to open. Thus, a programmed search for the optimum timing phase is adaptively controlled in accordance with the changing distortion. The timing phase is continually biased toward the position of lowest distortion and settles down to a small fluctuation about this position.

It is a feature of this invention that the distortion monitor and the timing phase search programmer can be implemented by either analog or digital components.

DESCRIPTION OF THE DRAWING

A fuller understanding and better appreciation of the objects and features of this invention will be obtained from a consideration of the following detailed description and the drawing in which.

DETAILED DESCRIPTION

Figure 1A:
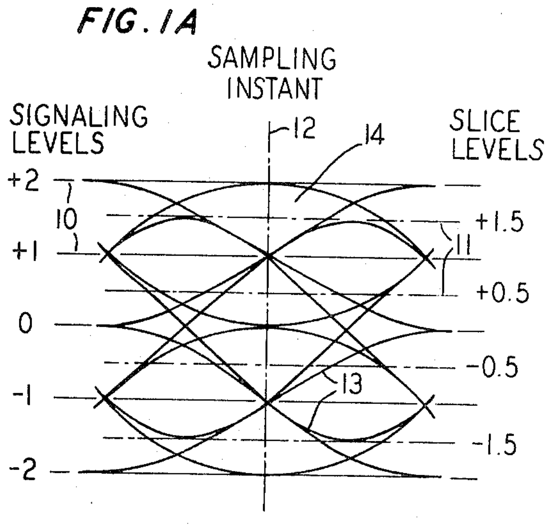
FIGS. 1A and 1B are respective actual and idealized eye pattern diagrams for a random multilevel digital data train.

When a random data wave which may assume two or more levels at synchronous sampling instants is displayed on a synchronized oscilloscope with a persistence extending over two or more signaling intervals, a characteristic pattern results. Because of the appearance of the openings between the superimposed traces, the display is called an eye pattern. For a random binary wave using bipolar AM transmission, a single eye opening results. For $n$-level transmission, $n$-1 eyes, one above the other, result. FIG. 1A represents a five-level eye pattern which results from transmitting a ternary signal in the partial-response format disclosed in E. R. Kretzmer U.S. Pat. No. 3,388,330, issued June 11, 1968, particularly that shown in FIG. 23$a$ therein with the modification that levels $\pm2$ are also permitted. In the five-level eye pattern, the signaling levels 10 are proportional to 0, $\pm1$ and $\pm2$. Transitions 13 between any pair of these levels may occur. Slicing or threshold levels 11 are set midway between the nominal signaling levels 10 and designated $\pm0.5$ and $\pm1.5$. A sampling instant 12 is to be chosen at the optimum eye opening 14. At this instant the decision is made as to whether the incident signal level is above or below each of the slicing levels.

It is apparent that the more signaling levels transmitted, the smaller is the proportion of the signaling interval in which valid decisions are possible. The horizontal dimension of the eye opening indicates this factor. It is further apparent that the vertical opening of the eye is contracted as the noise and intersymbol interference distortion increases. From experience, it has been learned that the eye opening is not a static quantity, but both horizontal and vertical dimensions vary in a complex way with time. With adaptive equalizers, as presently programmed, phase changes in the timing wave are tracked in a way that masks their occurrence. The symmetry of the eye pattern is preserved in spite of these phase changes, while the traces are dispersed in a random way in the vertical direction. The instant of maximum eye opening is thus not reliably ascertainable, and such instant does not provide the proper distortion measure.

Figure 1B:
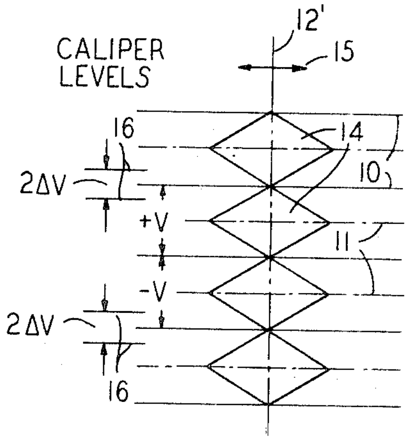

According to this invention, a measure of signal distortion is related to the deviation of actual signal levels from the nominal expected levels by establishing adjustable auxiliary slicing levels straddling at least a pair of nominal signal levels. FIG. 1B abstracts from FIG. 1A the eye openings 14 within which decisions as to the probable received signal levels can reliably be made. Nominal signal levels +V and −V, symmetrically disposed about the zero axis of the eye, are chosen to be monitored for distortion. A digital pulse amplitude modulation (PAM) transmission system would ideally yield a received signal with one or the other of the values +V or −V at the sampling instant. In any real system, the actual received values will be randomly dispersed about the ideal levels due to intersymbol interference and noise. A measure of this dispersion is adopted for the purposes of this invention as the deviation ±ΔV from the nominal values ±V. ΔV is defined as the value for which 50 percent of the received amplitudes occur in either of the regions (−V−ΔV, −V+ΔV) or (V−ΔV, V+ΔV). These regions are shown in FIG. 1B as lying between auxiliary pairs of levels 16. The spacing between each such pair of levels is clearly 2ΔV.

In this invention, the levels 16 are made adjustable and each received signal is sliced with reference to the last such levels. Apparatus is provided for automatically expanding or contracting 2ΔV as each received signal amplitude is found to lie between or outside the levels 16. These levels are hereinafter referred to as caliper levels to suggest their adjustability. In order to correlate caliper motion with timing phase, the sampling instant is made to scan the eye opening as indicated by vertical broken line 12′ and double-headed arrow 15.

Figure 2:
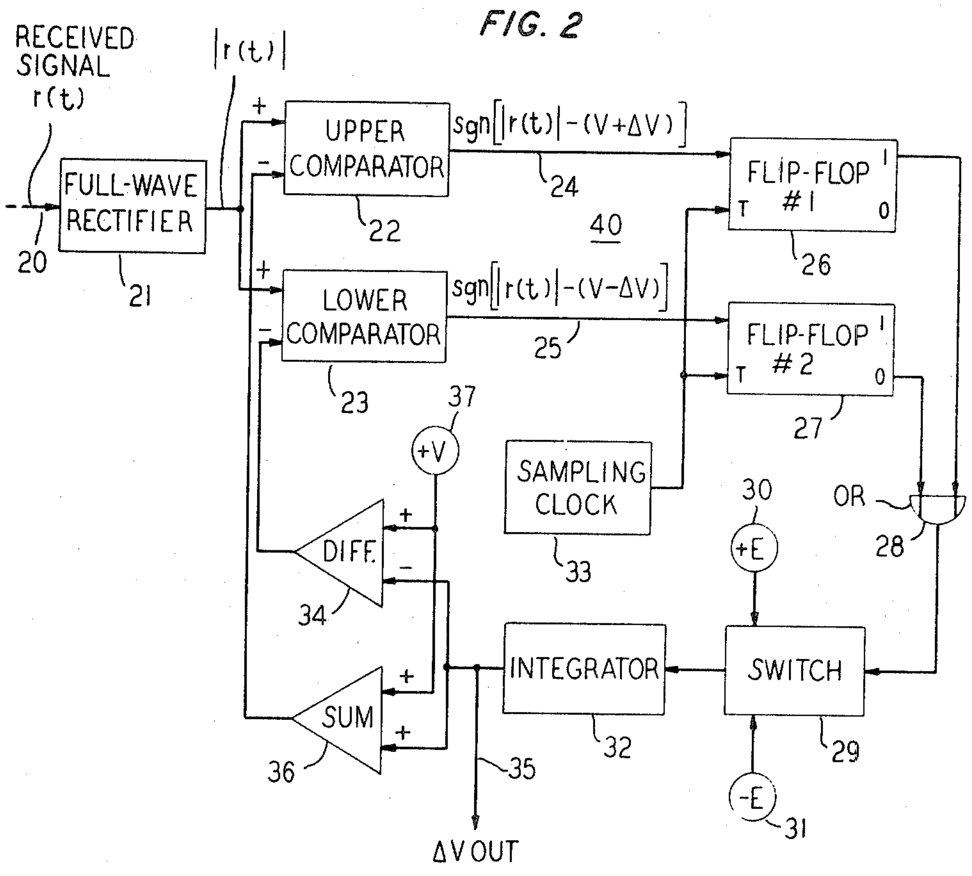
FIG. 2 is a functional block diagram of a distortion monitor in accordance with this invention.

FIG. 2 is a block diagram of apparatus for controlling the caliper levels in accordance with the status of the received signal at the sampling instant. The distortion monitoring apparatus, generally designated 40, of FIG. 2 comprises a signal input 20, a full-wave rectifier 21, upper and lower comparators or variable-level slicers 22 and 23, flip-flops 26 and 27, OR-gate 28, switch 29, integrator 32, sampling clock 33, reference voltage sources 30, 31 and 37 and sum and difference circuits 36 and 34.

The received signal $r(t)$, having significant nominal signaling levels ±V, is received from a transmission channel on lead 20. Such channel may or may not include an adaptive equalizer. Should the received signal also include nominal levels other than ±V, it is understood that the caliper adjustment circuits will be inhibited. Proper operation can be assured only when the received signals include samples with the two pairs of decision levels selected.

Since the pairs of caliper levels 16 shown in FIG. 1B are symmetrical about fixed reference levels, they may conveniently be folded about the zero level and effectively superposed. This is accomplished in full-wave rectifier 21, whose output therefore becomes the absolute value $|r(t)|$. The output of rectifier 21 is compared with the caliper levels (V+ΔV and V−ΔV) in comparators 22 and 23. Initially ΔV is taken at some arbitrary value. Comparators 22 and 23 may conveniently be well-known slicing circuits. Upper comparator 22 is arranged to have a significant output when its input is greater in amplitude than (V+ΔV). Correspondingly, lower comparator 23 is arranged to have a significant output when its input is greater in amplitude than (V−ΔV). Accordingly, the output of comparator 22 on lead 24 is the algebraic sign of $[|r(t)|-(V+\Delta V)]$ and that of comparator 23 on lead 25, the algebraic sign of $[|r(t)|-(V-\Delta V)]$, as is indicated in FIG. 2.

The signals on leads 24 and 25 respectively drive flip-flops 26 and 27, each of which is set for a significant input and reset otherwise. However, flip-flops 26 and 27 are arranged to respond only in coincidence with pulses from sampling clock 33 at their toggle (T) inputs. The set (1) output of flip-flop 26 and the reset (0) output of flip-flop 27 are applied in common to logical OR-gate 28. Thus, when the absolute value $|r(t)|$ lies within the range (V+ΔV) and (V−ΔV) at the sampling instant, flip-flop 26 will be in its 0 state and flip-flop 27 in its 1 state and no significant output will appear from OR-gate 28. On the other hand, when $|r(t)|$ is outside the mentioned caliper range, either flip-flop 26 will switch to its 1 state or flip-flop 27, to its 0 state. In the latter cases, OR-gate 28 will operate switch 29.

Switch 29 is a simple transfer switch, connecting its output lead in the alternative to sources 30 or 31. These sources provide equal reference voltages E of opposite polarity. The output of switch 29 is integrated in integrator 32. During each sampling interval of length T integrator 32 is driven by ±E according to the value of the control output of OR-gate 28. The output of integrator 32 on lead 35 becomes an estimate of ΔV. The incremental change for each sampling interval is ET. This output is also applied to sum and difference amplifiers 36 and 34. Both amplifiers 34 and 36 have as common inputs the reference voltage V from source 37. The value V is the nominal signaling level to be expected and is preferably regulated. The output of summing amplifier 36 is used as a reference by upper comparator 22 and similarly the output of differencing amplifier 34 is used as a reference by lower comparator 23, as indicated in FIG. 2.

At each sampling instant during which $|r(t)|$ lies between the calipers the voltage in integrator 32 will be reduced by the increment ET and the calipers will contract in an attempt to improve the distortion estimate. Conversely when $|r(t)|$ falls outside the calipers, the voltage in integrator 32 will be increased by the increment ET and the calipers will expand in an attempt to capture the next sample. Since T is relatively fixed, the increment is substantially proportional to E, the reference voltage for switch 29. Therefore, E is advantageously chosen to produce relatively smooth operation of the system. For operation over a large number of sampling instants, the voltage at the output of integrator 32 will tend toward the defined value of ΔV: namely, that value within which half of the received amplitudes occur. However, the system is prepared at all times to respond to variations from the median value.

The deviation ΔV appearing on lead 35 can be used in conjunction with manual adjustments of the phase of the sampling wave from clock 33 to determine whether such shifts in phase improve or degrade the overall distortion compensation of the data receiver. Unfortunately, an increase or decrease in the deviation provides no indication as to the proper direction for changing the phase of the sampling wave. Thus, manual adjustment becomes a matter of trial and error. Direct control of the sampling clock by the output of integrator 32 does not appear at first glance to be promising.

According to another aspect of this invention, the ambiguity of the distortion monitor output is overcome by allowing the phase of the sampling clock in effect to scan or strobe the received eye pattern continuously subject to reversal of direction whenever the distortion is found to be increasing.

Figure 3:
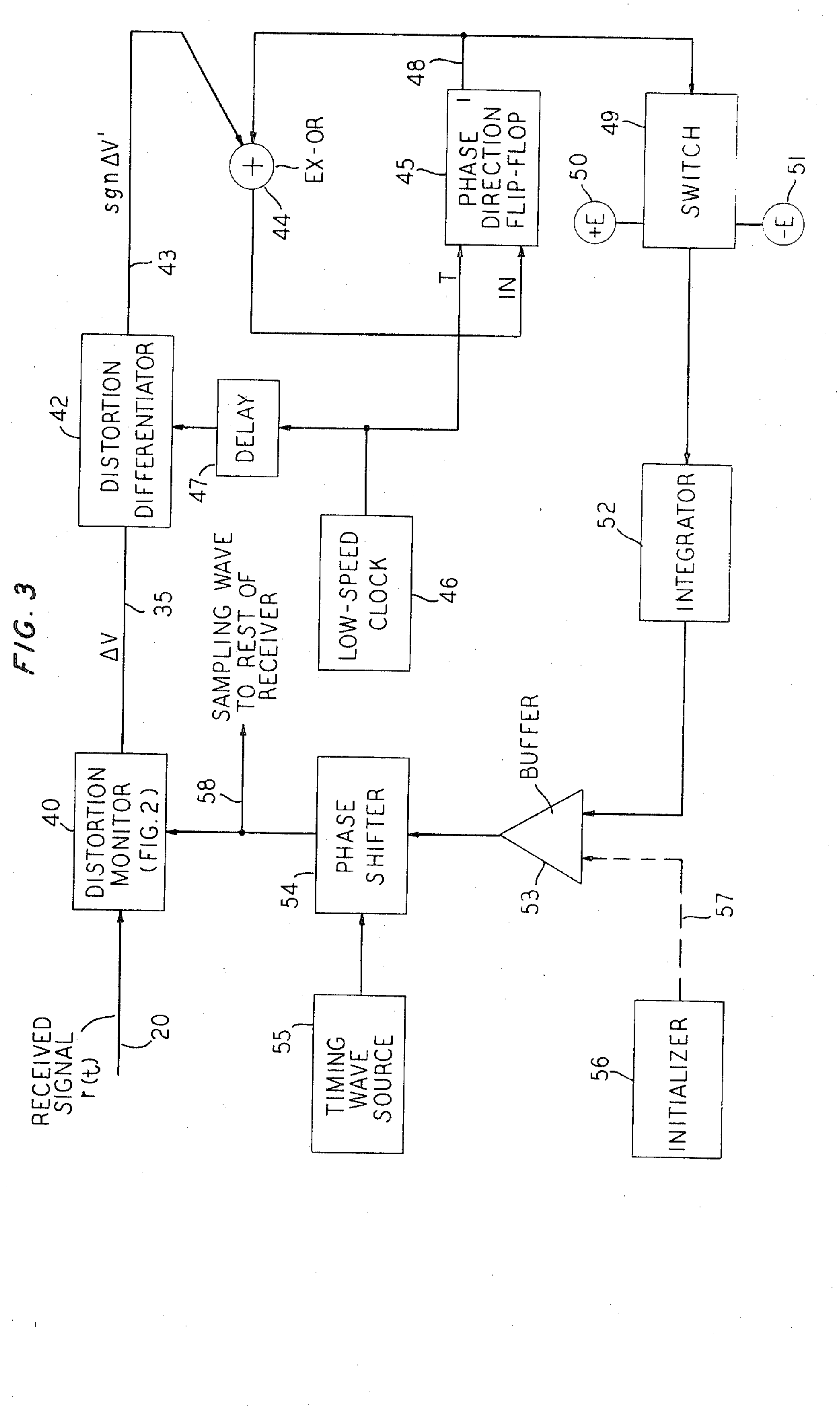
FIG. 3 is a functional block diagram of a programmed timing phase control system in accordance with this invention.

FIG. 3 is a block diagram of a sampling wave phase control programmer according to this invention. The phase control programmer comprises, complementary to the distortion monitor 40 of FIG. 2, distortion differentiator 42, low-speed clock 46, exclusive-OR-circuit 44, phase-direction flip-flop 45, switch 49, integrator 52, initializer 56, buffer 53, timing-wave source 55 and phase shifter 54. Some of these elements are identical in function to similar elements in FIG. 2.

The operation is substantially as follows. The received signal $r(t)$, equalized or not, incident on input lead 20 is monitored for distortion in block 40 as previously described and the control signal ΔV on lead 35, which has been expanding and contracting the calipers, is now applied to distortion differentiator 42. Differentiator 42 generates the slope ΔV′ of the distortion monitor control signal as an algebraic sign. Thus, if the distortion is increasing from sample to sample, the output on lead 43 will be positive. It will be negative otherwise. Lead 43 supplies one input to exclusive-OR-gate 44, which operates in well-known fashion to produce a significant output only when its inputs are of opposite sense. The other input to exclusive-OR-gate 44 is furnished with the 1 output of phase direction flip-flop 48. Flip-flop 48 is toggled by the output of low-speed clock 46, which may conveniently have a period measured in seconds, whereas the sampling wave period is measured in milliseconds. There need be no fixed relation between the sampling clock timing and that of the low-speed clock, however. The output of low-speed clock 46 also resets distortion differentiator 42 to a reference condition by way of delay unit 47.

When exclusive-OR-gate 44 produces its significant output at the toggling instant, this output is reversed. Otherwise, it is not affected. Phase-direction flip-flop 45 controls transfer switch 49 over lead 48. Its 1 output causes the positive voltage E from reference source 50 to be applied to integrator 52 and the absence of such output causes switch 49 to apply a negative voltage E from source 51 to integrator 52. Integrator 52 controls phase shifter 54 through buffer 53 in such a manner as to cause an incremental shift in phase of the output of timing wave source 55 in a direction determined by an increase or decrease in its own output. Phase shifter 54 may advantageously control small incremental phase shifts in the timing wave. Timing wave source 55 produces the nominal sampling frequency, and may itself have its frequency locked to some other characteristic of the received signal, such as a pilot wave. The phase-shifted timing wave on lead 58 is applied to distortion monitor 40 as well as to other receiver circuits, such as an adaptive equalizer, not specifically shown in FIG. 3.

The overall effect of the distortion monitor 40 and the phase programmer can be summarized. Distortion monitor 40 operates to expand or contract the spacing of the caliper voltages as the received signal falls without or within the previously set calipers at the sampling rate. Distortion differentiator 42 indicates to the phase programmer whether the caliper separation over the low-speed clock interval has on balance increased or decreased. Increasing caliper spacing is taken to be synonymous with increasing distortion. The search programmer interprets increasing distortion to mean that the phase of the timing wave is changing in the wrong direction. Therefore, the direction of the phase shift is reversed. However, when distortion differentiator 42 indicates decreasing distortion, no change is made in the output of phase-direction flip-flop 45 and the slewing of the timing phase is continued in the same direction.

Initializer 56 is provided for startup of the system. A signal transmitted over lead 57 and buffer 53 to phase shifter 54 establishes an initial setting which has been determined from foreknowledge of the system or from special startup signals. After initialization, lead 57, which is shown broken in FIG. 3, is opened. The adaptive search continues from the initial setting.

Figure 4:
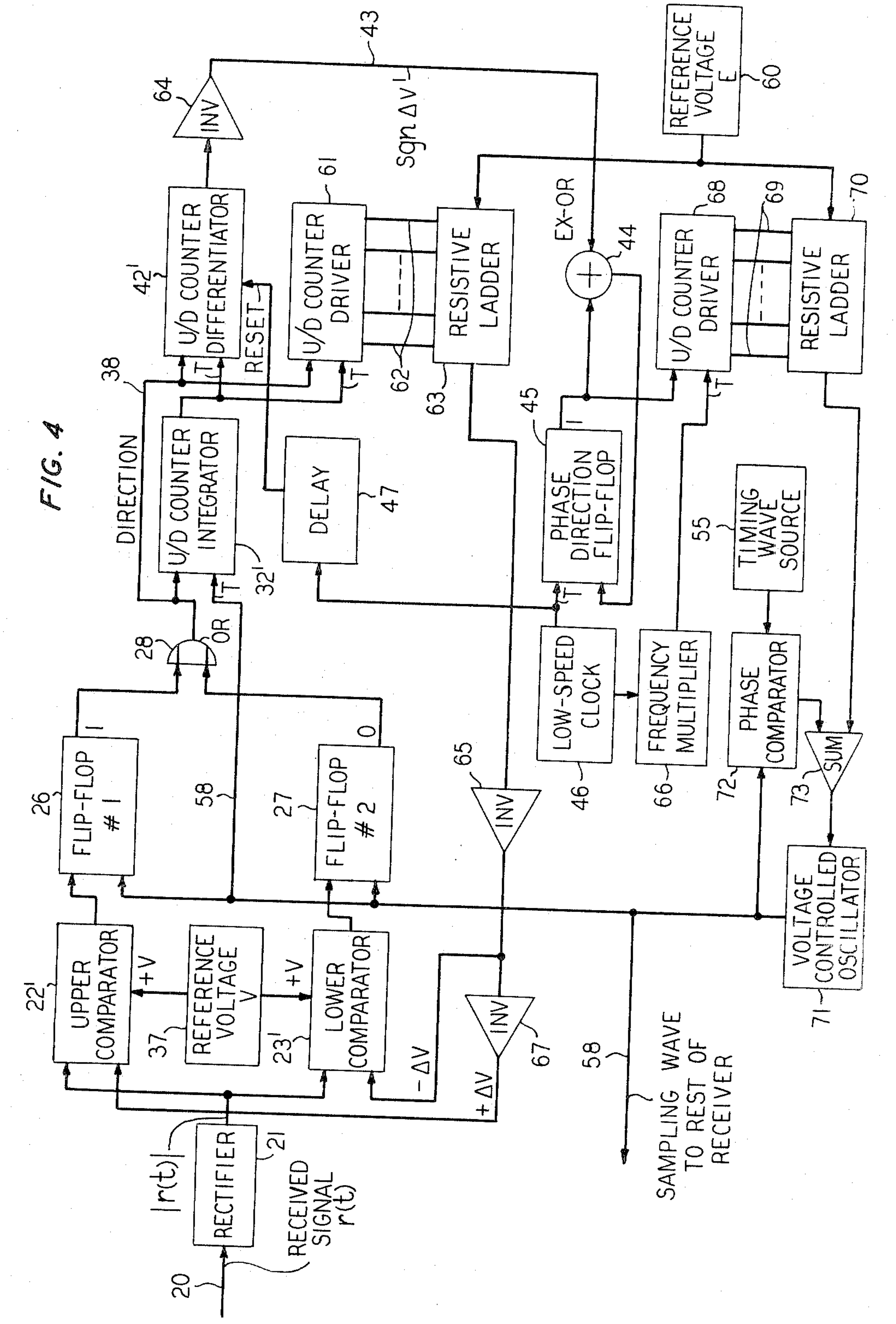
FIG. 4 is a functional block diagram of a dynamic timing phase recovery system controlled by a distortion monitor according to this invention.

FIG. 4 is a block diagram of a practical embodiment of the eye pattern monitor of this invention and uses digital circuitry. Wherever possible, designators common to FIGS. 2 and 3 are used for similar functional blocks.

The distortion monitor portion of FIG. 4 is substantially the same as that shown in FIG. 2 insofar as input 20, rectifier 21, upper and lower comparators 22′ and 23′, reference voltage source 37, flip-flops 26 and 27 and OR-gate 28 are concerned. Comparators 22′ and 23′ differ only in the manner in which the adjustable caliper levels are supplied. Switch 29, integrator 32 and sum and difference circuits 34 and 36, however, are digitalized by means of up-down binary counters and a resistive ladder network.

Signals from OR-gate 28, indicating opening and closing of the calipers are toggled into up-down binary counter 32′ at the sampling rate, and are in effect integrated. A high up-count indicates increasing distortion and vice versa. The output of integrator 32′ is the algebraic sign of the deviation ΔV. The output of counter 32′ drives two additional up-down counters 42′ and 61, whose counting directions are controlled over lead 38 from the output of OR-gate 28. Counter 61 controls by way of leads 62 connected to the outputs of individual counter stages the incrementation of resistive ladder 63. An eight-stage binary counter, for example, can control 256 steps of attenuation in resistive ladder 63, as is well known. Resistive ladder 63 attenuates the fixed output of reference voltage source 60 to establish the estimated deviation ΔV. The voltage ΔV is twice inverted in inverters 65 and 67 and applied to upper comparator 22′ as +ΔV and to lower comparator 23′ as −ΔV. Reference voltage V is furnished in common to comparators 22′ and 23′ from source 37 as shown. The comparators suitably combine the voltage V with voltages ±ΔV to generate the caliper levels.

Up-down counter 42′, which is toggled by the output of counter 32′, functions as a distortion differentiator. Counter 42′ is regularly set to the all-one state by the output of low-speed clock 46 after a short delay in unit 47. Counter 42′ then repeats the changes in driver counter 61 for resistive ladder 63 during the low-speed clock cycle. A net up-count causes an overflow in counter 42′ and drives its most significant bit to zero. This zero output is inverted in inverter 64 and serves as an indication that distortion has increased over the low-speed clock interval. No change or a net down-count indicates decreasing distortion by leaving a one in the significant bit position of counter 42′. The polarity of the signal on lead 43 thus indicates the algebraic sign of the derivative of the deviation ΔV.

Low-speed clock 46 toggles phase-direction flip-flop 45 and the 1 output thereof is compared in exclusive-OR-circuit 44 with the sign of ΔV′ on lead 43 to control its change of state as previously explained. The functions of switch 49 and integrator 52 in FIG. 3 are performed digitally in up-down counter 68 which is toggled at a selected multiple of the low-clock rate, e.g. eight times, from frequency multiplier 66. Counter 68 operates in the same fashion as counter 61 and counts up when phase-direction flip-flop 45 is in the 1 state and down otherwise. Its output drives further resistive ladder 70 over leads 69 in a manner similar to that by which ladder 63 is controlled by counter 61. Ladder 70 serves as an incremental attenuator for the output of voltage source 60.

The programmed sampling wave is generated in a phase-locked loop comprising voltage-controlled oscillator 71, phase comparator 72 and summer 73. Timing-wave source 55 supplies the nominal sampling-wave frequency to control the phase-locked loop through comparator 72. The control output of comparator 72, which is proportional to the phase difference between the outputs of oscillator 71 and source 55, is added to the phase-adjust voltage from ladder 70 in summer 73 to increment the phase of the sampling wave. The equilibrium of the phase-relation between the programmed sampling wave from oscillator 71 and the reference timing wave from source 55 yields a difference output from phase comparator 72 of equal magnitude and opposite sign relative to the phase adjust voltage from ladder 70. Thus, over the linear range of phase comparator 72, the phase of the programmed sampling wave is linearly shifted by the phase-adjust voltage from ladder 70.

The output of summer 73 may advantageously be filtered to smooth the abrupt steps of the digitally controlled phase-adjust voltage.

The number of stages in integrator-counter 32′ may be chosen to control the time over which distortion samples are averaged before a change is made in caliper spacing. In a given system, it may be desirable to provide means for bypassing some stages of the integrating counter 32′, for changing the frequency of low-speed clock 46 and for changing the multiplying factor of frequency multiplier 66. For example, during startup procedures in a transmission system, the low-speed clock rate may be increased to shorten the startup period. Bypassing several stages of counter 32′ will yield faster caliper response at the expense of some loss of resolution of $\Delta V$. Increasing the multiplying factor of multiplier 66 correspondingly increases the number of phase changes for each low-speed clock interval to assure correct estimation of the sign of $\Delta V'$ at the lower resolution of $\Delta V$.

On the other hand, once the transmission system is in full operation it may be desirable to make adaptive adjustments more gradually to perturb the system as little as possible. In a practical system, the phase steps were established at 3.6° per step; 24 steps per second were taken during startup and only 3 steps per second during message transmission. The fewer steps taken per second, the less is the system disturbed and the more is the noise compensated.

A timing recovery system has been described which has particular utility in tightly band-limited date transmission systems. Conventional timing recovery systems assume that symmetry in the impulse response of the transmission channel guarantees freedom from distortion and attempt to locate the sampling instant at the center of symmetry. The system of this invention seeks a sampling point at which noise and intersymbol effects are minimized without regard to symmetry of response.

While this invention has been described in terms of a specific illustrative embodiment, numerous modifications will occur to those skilled in the art without departing from the principles disclosed herein.

What is claimed is:

1. A distortion monitor for received synchronous digital data having a nominal absolute magnitude comprising means establishing adjustable caliper levels symmetrically straddling said nominal magnitude, means comparing the magnitude of received data at synchronous instants with each of said caliper levels to produce first and second output signals indicating whether the magnitude of said data is above or below the respective levels, means combining said first and second signals to form a third signal indicating whether said data is outside or between said caliper levels collectively, and hence, whether distortion is increasing or decreasing, and means responsive to said third signal adjusting the spacing between said caliper levels in a direction tending to capture succeeding data magnitudes therebetween.

2. The distortion monitor of claim 1 in which said means controlling the spacing between caliper levels comprises an integrator having a variable output, a transfer switch directly controlled by said third signal to apply a potential of one or the other polarity to said integrator as said third signal is in one state or the other, a potential source of said nominal magnitude, and means respectively adding to and subtracting from said nominal magnitude the potential of the output of said integrator to establish said caliper levels.

3. The distortion monitor of claim 1 in which said means controlling the spacing between caliper levels comprises a first multistage reversible counter counting at said synchronous rate and having its counting direction determined by said third signal, a resistive ladder network having steps of proportionately weighted values, a second multistage reversible counter driven by said first counter, means connecting the several stages of said second counter to the steps of said ladder whereby the attenuation factor of said ladder is proportional to the count in said second counter, a potential source having an output of said nominal magnitude, means shunting said ladder across said potential source to form a ladder output proportional to the deviation of received data magnitudes from said nominal magnitude, and means respectively adding to and subtracting from the output of said potential source the output of said ladder to constitute the respective caliper levels.

4. In combination with a synchronous digital data transmission system, a distortion monitor for data signals received at a terminal of said system, said monitor producing an output proportional to the deviation of received data signals at synchronous sampling instants from a predetermined absolute magnitude, a wave source operating at the synchronous data rate to supply timing signals at said sampling instants, reversible phase-shifting means continuously incrementing the phase of the timing signals from said source, means differentiating the output of said distortion monitor to obtain a derivative signal indicative according to polarity of whether distortion is increasing or decreasing, and means responsive to the polarity of said derivative signal which indicates increasing distortion reversing the direction of incrementation of said phase-shifting means.

5. The combination defined in claim 4 in which said reversing means comprises a flip-flop toggled at a fixed rate, means correlating the output of said flip-flop with the derivative signal from said differentiating means to determine the output state of said flip-flop, an integrator, potential sources of equal opposite polarity, a transfer switch controlled by the output state of said flip-flop connecting said potential sources in the alternative to said integrator, and means connecting said integrator to said phase-shifting means to control its direction of operation.

6. The combination defined in claim 4 in which said reversing means comprises a multistage reversible counter having a fixed counting rate for integrating the output of said distortion monitor, reversible resistive ladder network having steps of proportionately weighted values, means connecting the several stages of said counter to the steps of said ladder whereby the overall voltage transfer characteristic of said ladder is proportional to the count in said counter, a potential source having a stable reference output, and means connecting said ladder across said potential source to form a ladder output proportional to a phase to be imparted to said sampling wave; and said phase-shifting means comprises a voltage controlled oscillator, a phase comparator having an output proportional to the difference in the phases of the waves from said sampling wave source and said oscillator, means summing the outputs of said ladder and said phase comparator to form a control signal, and means responsive to said control signal adjusting said voltage controlled oscillator to yield an equilibrium value of phase shift relative to that of said sampling wave source proportional to the output of said ladder network.

7. The combination defined in claim 4 in which said reversing means comprises a flip-flop toggled at a fixed rate, means correlating the output of said flip-flop with the derivative signal from said differentiating means to form a direction control signal for said flip-flop, and means connecting said flip-flop to said phase-shifting means to determine its slewing direction.

8. In a receiver for synchronous digital data in a band-limited transmission system in which distortion occurs, the combination comprising means establishing a nominal received amplitude level, means generating a variable difference signal which when added to and subtracted from said nominal level provides caliper levels symmetrically bracketing said nominal level, means rectifying received signals to obtain their absolute values, means responsive to a comparison of rectified received signals with said caliper levels producing a control output indicative of whether said received signals lie within or outside said caliper levels, a timing-wave source at said synchronous rate, means jointly responsive to said timing wave and said control output incrementing said variable difference signal in an increasing or decreasing direction depending on whether said received signals fall outside or inside said caliper levels, an incrementally variable phase-shifter in series between said timing wave source and said incrementing means, and means responsive to an increase of said variable difference signal reversing the direction of incrementation of said phase-shifter.

9. The method of controlling the phase of the sampling wave in the receiver of a synchronous digital data transmission system comprising the steps of establishing a pair of adjustable caliper levels straddling a nominal received magnitude, rectifying bipolar received signals to obtain their absolute values, comparing rectified received levels at sampling instants with said caliper levels to generate control signals indicative of whether such received signals are within or outside such caliper levels, incrementally expanding or contracting caliper level spacing in accordance with said control signals, incrementally sweeping the phase of a sampling wave between sampling instants, differentiating said control signals to determining the direction of distortion change over a range of sampling instants, and reversing the direction in which the phase of the sampling wave is swept whenever the differentiated control signals indicate distortion is increasing.

* * * * *